US012605870B2

(12) United States Patent
Susa et al.

(10) Patent No.: US 12,605,870 B2
(45) Date of Patent: \*Apr. 21, 2026

(54) INJECTION MOLDING MACHINE AND METHOD OF OPERATING THE SAME

(71) Applicant: The Japan Steel Works, Ltd., Tokyo (JP)

(72) Inventors: Keigo Susa, Shinagawa-ku (JP); Motomu Furumoto, Shinagawa-ku (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 110 days.

This patent is subject to a terminal disclaimer.

(21) Appl. No.: 18/540,270

(22) Filed: Dec. 14, 2023

(65) Prior Publication Data

US 2024/0198569 A1 Jun. 20, 2024

(30) Foreign Application Priority Data

Dec. 16, 2022 (JP) ................................. 2022-201304

(51) Int. Cl.
| | |
|---|---|
| *B29C 45/64* | (2006.01) |
| *B29C 45/17* | (2006.01) |
| *B29C 45/20* | (2006.01) |
| *B29C 45/26* | (2006.01) |

(Continued)

(52) U.S. Cl.
CPC ........ *B29C 45/641* (2013.01); *B29C 45/1756* (2013.01); *B29C 45/1777* (2013.01); *B29C 45/20* (2013.01); *B29C 45/2602* (2013.01); *B29C 45/2606* (2013.01); *B29C 45/401* (2013.01); *B29C 45/7626* (2013.01); *B29C 45/7653* (2013.01); *B29C 2045/645* (2013.01);

*B29C 2945/76006* (2013.01); *B29C 2945/76113* (2013.01); *B29C 2945/76157* (2013.01);

(Continued)

(58) Field of Classification Search
CPC ........... B29C 45/1747; B29C 45/2606; B29C 2045/645; B29C 2045/1764; B29C 2045/1788; B29C 2945/76006
See application file for complete search history.

(56) References Cited

U.S. PATENT DOCUMENTS

| | | | | |
|---|---|---|---|---|
| 7,323,125 B2 * | 1/2008 | Uwaji | ................. | B29C 45/7693 |
| | | | | 700/200 |
| 7,387,506 B2 * | 6/2008 | Nagano | ............... | B29C 45/2606 |
| | | | | 425/589 |

(Continued)

FOREIGN PATENT DOCUMENTS

| | | | | | |
|---|---|---|---|---|---|
| CN | 108327198 A | * | 7/2018 | ............. | B29C 45/64 |
| CN | 118205161 A | * | 6/2024 | ............. | B29C 45/03 |

(Continued)

OTHER PUBLICATIONS

Non-Final Office Action issued in U.S. Appl. No. 18/540,431 mailed May 30, 2025.

*Primary Examiner* — Benjamin A Schiffman

(74) *Attorney, Agent, or Firm* — Foley & Lardner LLP

(57) ABSTRACT

An injection molding machine has a clamp that generates electromagnetic force and that secures a moving plate or a fixed plate using attractive force that is produced by the electromagnetic force; and a controller that controls separation force that acts on the moving plate or the fixed plate such that the separation force is less than the attractive force.

15 Claims, 8 Drawing Sheets

(51) Int. Cl.
  B29C 45/40          (2006.01)
  B29C 45/76          (2006.01)

(52) U.S. Cl.
  CPC ................. *B29C 2945/7623* (2013.01); *B29C
       2945/76505* (2013.01); *B29C 2945/76598*
                                      (2013.01)

(56)                References Cited

U.S. PATENT DOCUMENTS

| | | | | |
|---|---|---|---|---|
| 7,871,255 | B2 * | 1/2011 | Kimura ............... | B29C 45/1742 |
| | | | | 425/186 |
| 11,426,901 | B2 * | 8/2022 | Akamatsu ............... | B29C 45/64 |
| 2024/0198569 | A1 | 6/2024 | Susa et al. | |
| 2024/0198570 | A1 * | 6/2024 | Susa ................... | B29C 45/1742 |

FOREIGN PATENT DOCUMENTS

| | | | | | |
|---|---|---|---|---|---|
| EP | 3616871 | A1 * | 3/2020 | .......... | B29C 31/006 |
| JP | 2014097628 | A * | 5/2014 | | |
| JP | 2024086568 | A * | 6/2024 | | |
| TW | I404618 | B * | 8/2013 | ............. | B29C 33/32 |
| WO | WO-2019/202957 | A1 | 10/2019 | | |

* cited by examiner

Mold-opening force F1

Ejector pin reactive force F2

Mold-opening force F1

Nozzle contact force F3

Position of moving platen

Motor torque of
moving platen

End of movement of moving platen

Time

Guide pin separated from fixed mold

Start of movement of moving platen

Clamping mechanism unlocked

Set of three-dimensional
data and measurement of
motor torque

Three-
dimensional
data of mold

43

41

42

Estimated value
of mold-opening
force F1

INJECTION MOLDING MACHINE AND METHOD OF OPERATING THE SAME

FIELD OF THE INVENTION

The present application is based on and claims priority from Japanese Application No. 2022-201304, filed on Dec. 16, 2022, the disclosure of which is hereby incorporated by reference herein in its entirety.

The present disclosure relates to an injection molding machine and a method of operating the same.

DESCRIPTION OF THE RELATED ART

As the need for producing multiple products in smaller lots has been increasing recently, rapid replacement of molds is desired for an injection molding machine. WO2019/202957 discloses a magnetic clamp. The clamp includes a magnet having fixed polarities and a magnet having polarities that can be reversed by applying a current to a coil. Molds can be rapidly replaced by applying a current to the coil and thereby attracting the molds.

SUMMARY OF THE INVENTION

The attractive force for a mold depends on inherent characteristics of the mold such as the contact area between the mold and the clamp. When the attractive force is insufficient, a magnetic clamp cannot be used and a mechanical clamp may have to be used instead.

The present disclosure aims at providing an injection molding machine in which a magnetic clamp can be more easily used.

An injection molding machine of the present disclosure comprises a controller that controls separation force that acts in a direction opposite to attractive force that is produced by electromagnetic force such that the separation force is less than the attractive force.

According to the present disclosure, it is possible to provide an injection molding machine in which a magnetic clamp can be more easily used.

The above and other objects, features and advantages of the present invention will become apparent from the following description with reference to the accompanying drawings that illustrate examples of the present invention.

DESCRIPTION OF EMBODIMENTS

Overall Arrangement

Figure 1:
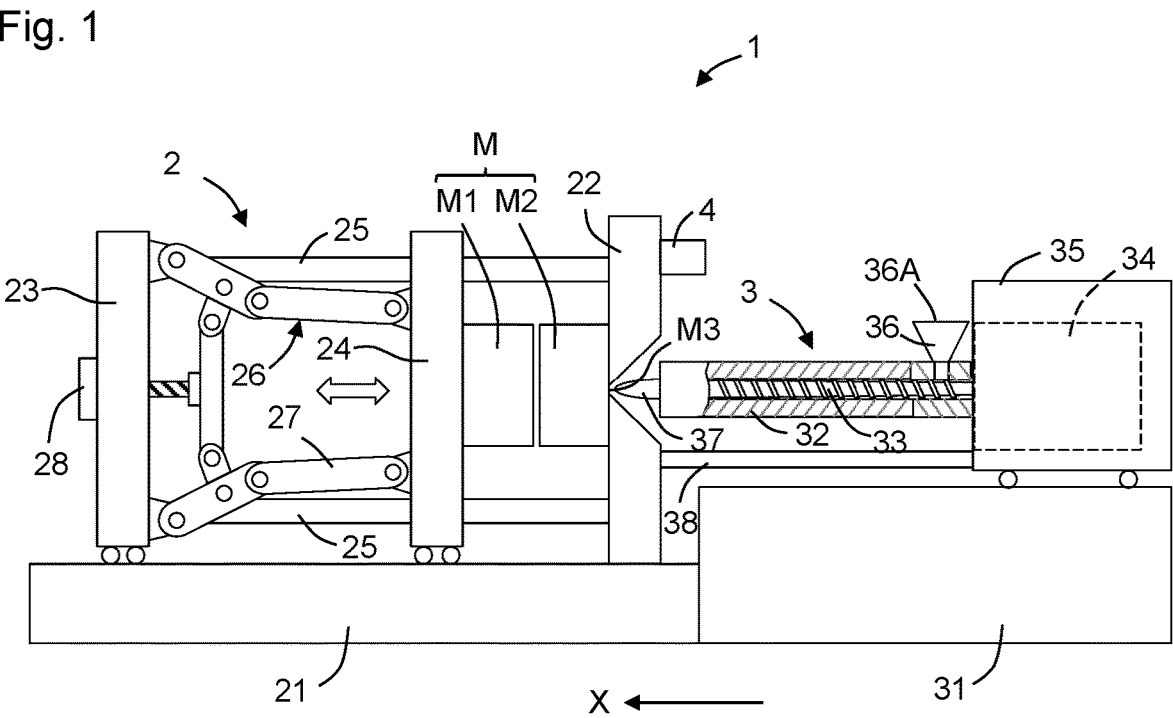
FIG. 1 is a schematic front view of an injection molding machine according to an embodiment.

FIG. 1 shows a schematic front view of injection molding machine 1 according to the present embodiment. Referring to FIG. 1, injection molding machine 1 is mainly comprised of clamping unit 2 for clamping a mold, injection unit 3 for heating and melting material to be injected and injecting the material, and controller 4. Controller 4 is provided to control the overall operation of injection molding machine 1, but in the description, functions that relate to the present embodiment will be mainly described. In the following descriptions, the direction in which screw 33 moves or the direction in which moving plate M1 moves is referred to as the X-direction. The X-direction is parallel to the horizontal direction. Moving plate M1 and fixed plate M2 may be referred to as mold M as a whole.

Clamping Unit 2

Clamping unit 2 is provided with fixed platen 22 that is fixed to bed 21 and to which fixed plate M2 is mounted, clamp housing 23 that can slide on bed 21, and moving platen 24 that can slide on bed 21 and to which moving plate M1 is mounted. Fixed platen 22 is connected to clamp housing 23 via tie bars 25. Clamping mechanism 26 for opening and closing mold M is provided between moving platen 24 and clamp housing 23. Clamping mechanism 26 includes toggle mechanism 27 and clamping motor 28 that drives toggle mechanism 27. Although not illustrated, clamping mechanism 26 may alternatively include a direct-pressure type clamping mechanism, i.e., a hydraulic clamping cylinder.

Injection Unit 3

Injection unit 3 is provided on base 31. Injection unit 3 is provided with cylinder 32, screw 33 that is housed in cylinder 32, and drive mechanism 34 for driving screw 33. Screw 33 is rotatably driven and is also driven in the X-direction by drive mechanism 34. Drive mechanism 34 is covered with cover 35. Hopper 36 for supplying material to be injected is provided near the rear end of cylinder 32. Hopper 36 is provided with material supply opening 36A from which material to be injected is supplied. At the front end of cylinder 32, injection nozzle 37 is provided that is pushed against fixed plate M2 to thereby supply material to be injected into cavity C (refer to FIG. 2A) that is formed by fixed plate M2 and moving plate M1.

Injection unit 3 includes nozzle touch mechanism 38. Nozzle touch mechanism 38 drives injection unit 3 forward such that injection nozzle 37 touches sprue bushing M3 of mold M. Nozzle touch mechanism 38 connects drive mechanism 34 to fixed platen 22. Nozzle touch mechanism 38 includes a toggle mechanism that uses a ball screw, but alternatively uses a mechanism having a hydraulic cylinder.

Configuration of Mold M

Figure 2A:
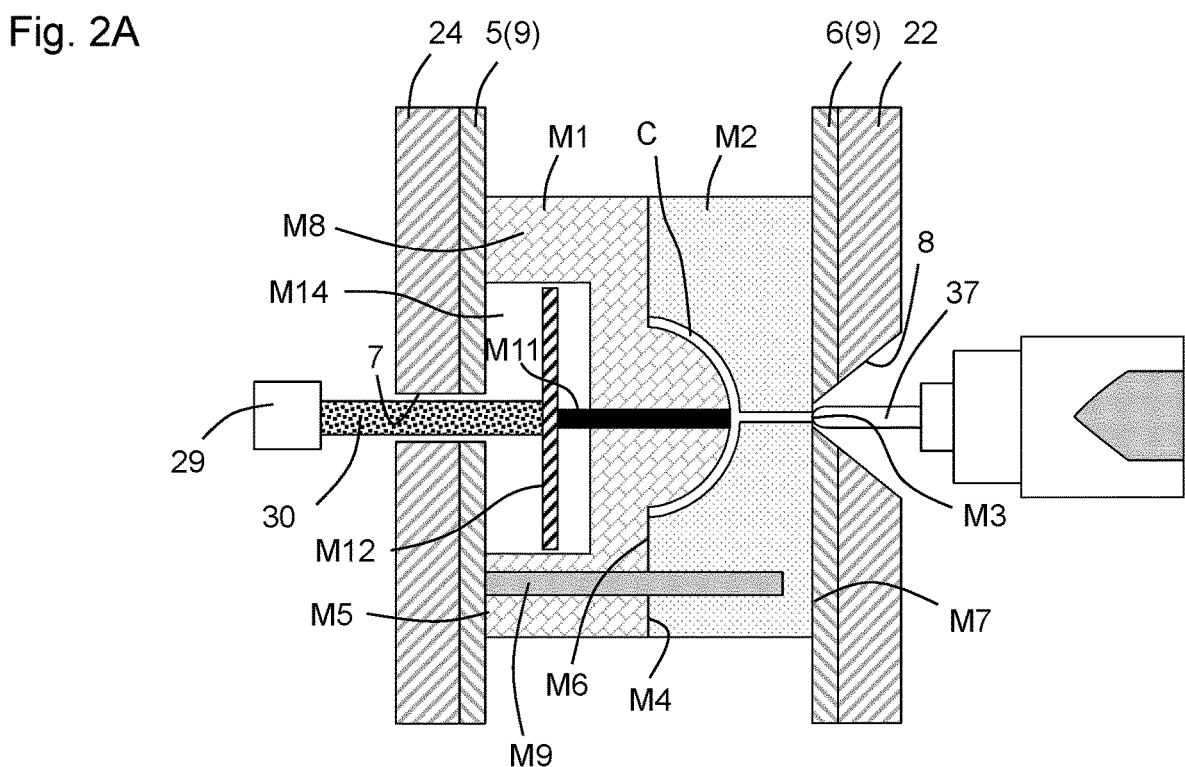
FIG. 2A is an exemplary sectional view illustrating a moving plate and a fixed plate when the mold is closed.
Figure 2B:
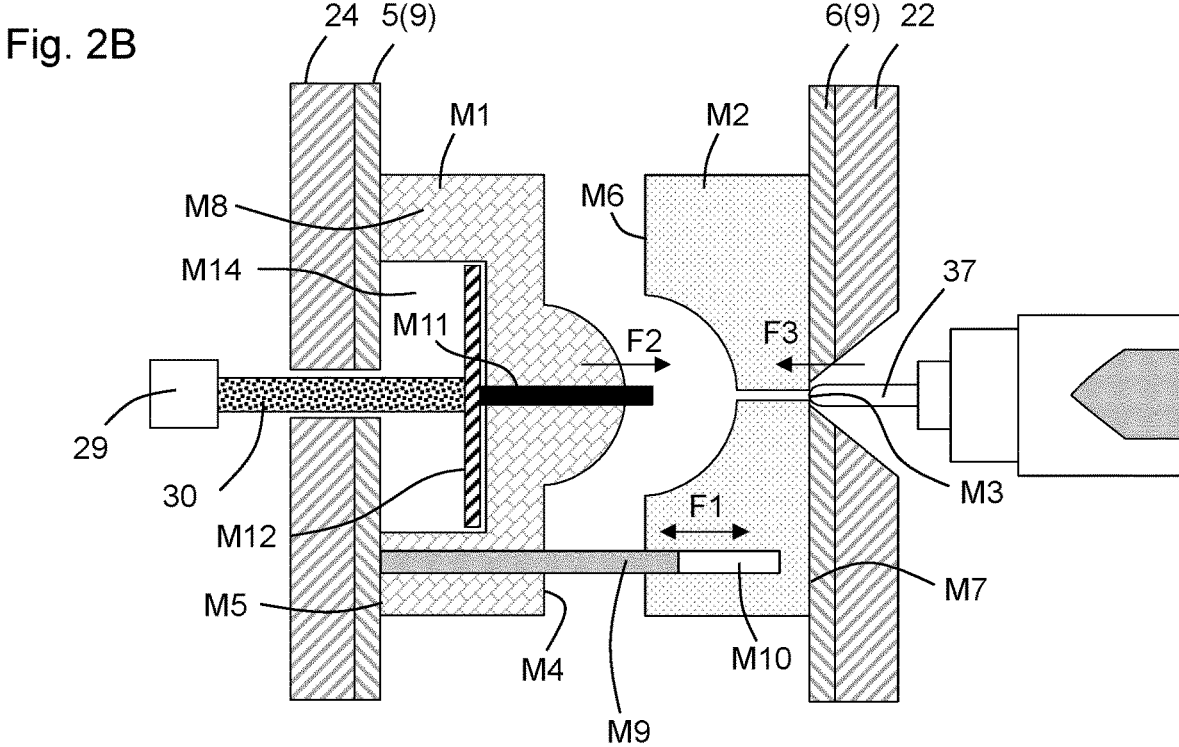
FIG. 2B is an exemplary sectional view illustrating a moving plate and a fixed plate when the mold is open.

FIGS. 2A and 2B are sectional views that illustrate exemplary moving plate M1 and fixed plate M2 in more detail. FIG. 2A shows moving plate M1 and fixed plate M2 when they are closed and FIG. 2B shows moving plate M1 and fixed plate M2 when they are open. Moving plate M1 has inner surface M4 that faces cavity C and outer surface M5 that is the back surface of inner surface M4. Fixed plate M2 has inner surface M6 that faces cavity C and outer surface M7 that is the back surface of inner surface M6. Inner surface M4 of moving plate M1 and inner surface M6 of fixed plate M2 face each other to form cavity C therebetween that is charged with material that is injected (for example, resin). Injection nozzle 37 for supplying the material to be injected to cavity C is pushed against fixed plate M2. As will be described later, injection nozzle 37 generates nozzle contact force.

Moving plate M1 has main body M8 that constitutes the contact surface that contacts fixed plate M2 (the parting line) and guide pin M9 that is supported by main body M8 and that protrudes from main body M8 toward fixed plate M2. Guide pin M9 is provided to locate moving plate M1 and fixed plate M2. Fixed plate M2 is provided with receiving bore M10 that receives guide pin M9. When moving plate M1 moves, guide pin M9 slides relative to receiving bore M10. Therefore, guide pin M9 is one example of sliding parts that slide relative to fixed plate M2. Guide pin M9 is provided at a part of inner surface M4 of moving plate M1 that is remote from cavity C. As will be described later, guide pin M9 generates mold-opening force.

Ejector pin M11 for pushing out a product from moving plate M1 is installed in moving plate M1. Ejector pin M11 penetrates through main body M8 of moving plate M1. Main body M8 of moving plate M1 is provided with cavity M14 that is open at outer surface M5, and ejector plate M12 is housed in cavity M14. Injection molding machine 1 has ejector pin drive mechanism 29 that drives ejector pin M11. Specifically, ejector pin drive mechanism 29 is connected to ejector rod 30 of injection molding machine 1, and ejector rod 30 penetrates through moving clamp 5 and moving platen 24 so as to push ejector plate M12. Ejector pin M11 is driven by ejector plate M12 that pushes ejector pin M11. As will be described later, ejector pin M11 generates ejector pin reactive force.

Configuration of the Clamps

Moving plate M1 is fixed to moving clamp 5, and moving clamp 5 is directly mounted on moving platen 24 by means of attachment members such as bolts (not illustrated). Fixed plate M2 is fixed to fixed clamp 6, and fixed clamp 6 is directly mounted on fixed platen 22 by means of attachment members such as bolts (not illustrated). In the following description, these clamps are referred to as clamp 9 when it is not necessary to distinguish moving clamp 5 and fixed clamp 6. An intermediate plate may be interposed between moving platen 24 and clamp 9 or between fixed platen 22 and clamp 9.

Clamp 9 generates electromagnetic force and secures moving plate M1 or fixed plate M2 by attractive force that is produced by the electromagnetic force. Moving platen 24 and moving clamp 5 are provided with through-hole 7 through which ejector pin M11 is inserted, and fixed platen 22 and fixed clamp 6 are provided with through-hole 8 that injection nozzle 37 enters.

Figure 3:
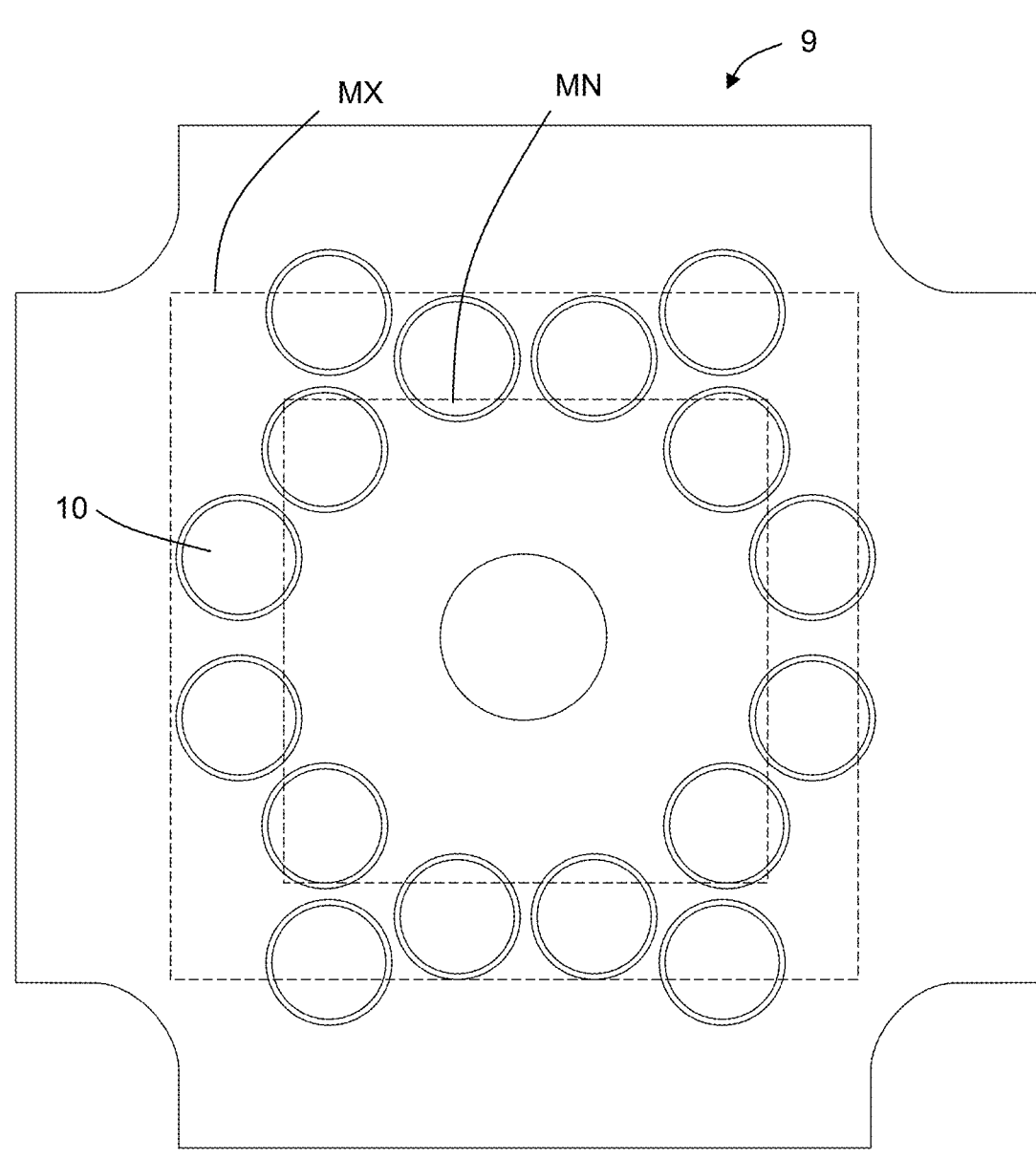
FIG. 3 is an exemplary plan view illustrating a clamp.

FIG. 3 shows a plan view of clamp 9. Moving clamp 5 and fixed clamp 6 have substantially the same configuration. Clamp 9 is provided with magnet blocks 10 that generate the attractive force that is produced by the electromagnetic force. Magnet blocks 10 generate the attractive force when magnet blocks 10 contact mold M. For this reason, the number of magnet blocks 10 that generate the attractive force depends on the size of mold M or the location at which mold M is mounted. Broken lines MX show the perimeter of mold M having the largest mountable size, and broken lines MN show the perimeter of mold M having the smallest mountable size.

Operation Principle of Clamp 9

Figures 4A, 4B:
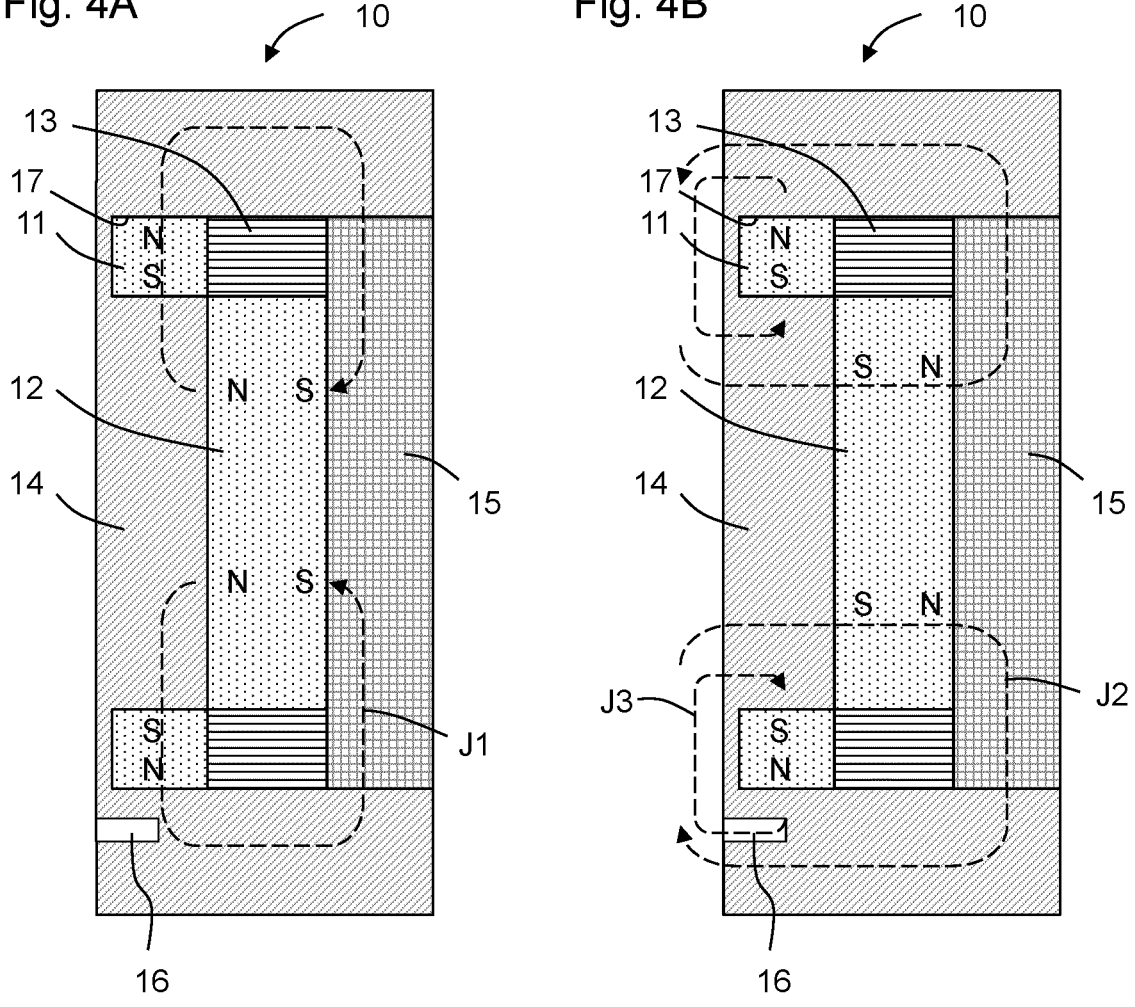
FIGS. 4A and 4B are conceptual views illustrating the operation principle of the clamp.

FIGS. 4A and 4B show the operation principle of clamp 9. FIG. 4A shows a state in which the attractive force of magnet block 10 is not generated (hereinafter referred to as a nonmagnetized state). FIG. 4B shows a state in which the attractive force of magnet block 10 is generated (hereinafter referred to as a magnetized state). The operation principle is common to moving clamp 5 and fixed clamp 6.

Magnet block 10 includes magnetically pinned magnet 11 whose magnetization direction (magnetic poles) is pinned, magnetically variable magnet 12 whose magnetization direction (magnetic poles) changes depending on the direction in which a current is applied to coil 13, support plate 14, and yoke 15. FIGS. 4A and 4B each show two sections of one magnetically pinned magnet 11 and two sections of one coil 13. Magnetically pinned magnet 11 is ring-shaped with the inner circumference magnetized to the S-pole and the outer circumference magnetized to the N-pole. Magnetically pinned magnet 11 is fitted into groove 17 of support plate 14. Magnetically variable magnet 12 is a circular plate having two main surfaces that are opposite to each other. Ring-shaped coil 13 is arranged around magnetically variable magnet 12. Magnetically variable magnet 12 is magnetized such that one of the two main surfaces is the N-pole and the other is the S-pole (or vice versa) depending on the direction in which a current is applied to coil 13.

Referring to FIG. 4A, in the nonmagnetized state, the magnetic pole of magnetically pinned magnet 11 and the magnetic pole of magnetically variable magnet 12 that are adjacent to each other have different polarities. Magnetic flux J1 that passes through magnetically variable magnet 12, support plate 14, magnetically pinned magnet 11, support plate 14, and then yoke 15 is generated inside clamp 9. Little magnetic flux J1 leaks to the outside of clamp 9 and no force that attracts mold M is generated. The operation to mount or remove mold M is performed in this state.

Referring to FIG. 4B, in the magnetized state, a current is applied to coil 13 and the magnetic pole of magnetically pinned magnet 11 and the magnetic pole of magnetically variable magnet 12 that are adjacent to each other have the same polarity. In the case of FIG. 4B, the magnetic pole of magnetically variable magnet 12 that faces magnetically pinned magnet 11 changes from the N-pole to the S-pole. Magnetic flux J2 that is generated by magnetically variable magnet 12 passes outward of magnetic flux J3 that is generated by magnetically pinned magnet 11, and magnetic fluxes J2 and J3 leak to the outside of clamp 9. In this manner, the attractive force that is produced by the electromagnetic force is generated and mold M is thereby fixed to clamp 9. Products are manufactured in this state.

Application of a current to coil 13 is performed such that the intensity of the magnetic field that is generated by coil 13 is smaller than the coercive force of magnetically pinned magnet 11 and greater than the coercive force of magnetically variable magnet 12. Therefore, the magnetization direction of magnetically pinned magnet 11 is fixed regardless of whether a current is applied to coil 13. On the other hand, magnetically variable magnet 12 maintains its magnetization state due to the coercive force once the magnetization is reversed. Therefore, a current may be applied only for a short time that is enough to reverse the magnetization. The application of the current is stopped after the magnetization is reversed. The configuration of magnetically pinned magnet 11 and magnetically variable magnet 12 is not limited to this example. Any configuration may be used as long as the magnetic pole of magnetically variable magnet 12 can be reversed by applying a current to coil 13 and the state in which magnetic flux leaks to the outside of clamp 9 and the state in which magnetic flux does not leak to the outside of clamp 9 can be switched. 35

Device for Measuring Magnetic Flux

Mold M has measurement devices 16 for measuring magnetic flux that are each installed in a respective magnet block 10. Each measurement device 16 has a search coil (not illustrated). The search coil detects magnetic flux in its vicinity and thereby outputs an induced voltage that is induced by the magnetic flux or an induced current that is induced by the magnetic flux. Because the magnetic flux in the magnetized state is different from the magnetic flux in the nonmagnetized state as described previously, the detection of the magnetic flux using the search coil makes it possible to judge whether each magnet block 10 that is combined with a corresponding search coil is in the magnetized state or in the nonmagnetized state.

Controller 4 (refer to FIG. 1) receives the output of each search coil, analyzes the output, and judges whether each magnet block 10 is in the magnetized state or in the nonmagnetized state. Because the attractive force of each magnet block 10 is known, controller 4 sums up the attractive forces of magnet blocks 10 that are in the magnetized state and thereby calculates the attractive force of clamp 9. When all magnet blocks 10 have the same attractive force, the attractive force of clamp 9 may be calculated by multiplying the attractive force of magnet block 10 by the number of magnet blocks 10 that are in the magnetized state.

Forces Applied to Mold M

Next, referring mainly to FIGS. 2A, 2B, 5A, and 5B, forces that are applied to mold M during the molding process will be described. First, terminology is defined as shown below. The separation force is a force that is applied in the direction to separate mold M from clamp 9 and is opposite to the attractive force. The attractive force is a force that uses electromagnetic force to attract mold M.

The moving plate separation force is a force that is applied in the direction to separate moving plate M1 from moving clamp 5

The fixed plate separation force is a force that is applied in the direction to separate fixed plate M2 from fixed clamp 6

The moving plate attractive force is a force that attracts moving plate M1 to moving clamp 5

The fixed plate attractive force is a force that attracts fixed plate M2 to fixed clamp 6

The retaining force is a force that pushes the mold against moving platen 24 or fixed platen 22 (the resulting force includes the attractive force, the separation force, the pushing force that is applied from the opposing plate, and so on)

Figure 5A:
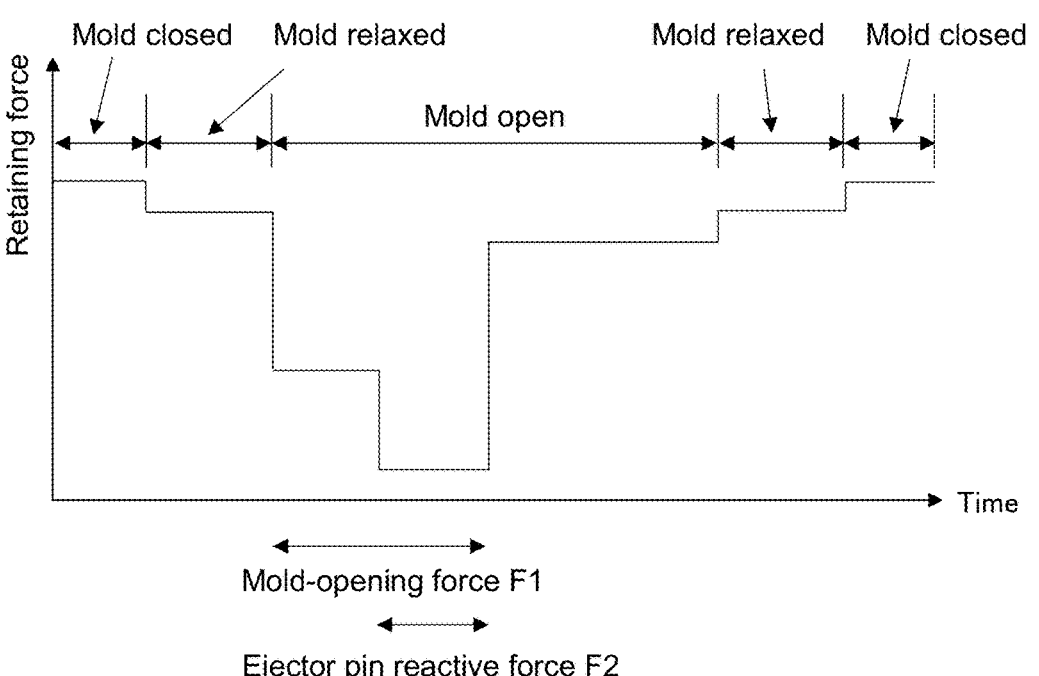
FIG. 5A is a conceptual view illustrating the force acting on the moving plate during a molding process.

FIG. 5A conceptually shows the retaining force that acts on moving plate M1 during one molding process. One molding process is a period from the start of the operation to release the closed-mold state (the state in which mold M is completely closed) to the completion of the operation to close the mold again. In the closed-mold state, moving plate M1 pushes fixed plate M2 and moving plate M1 receives reactive force of the same magnitude from fixed plate M2. This reactive force acts in the direction to push moving plate M1 against moving clamp 5. Since moving plate M1 receives the moving plate attractive force from moving clamp 5, the retaining force is the sum of the reactive force and the moving plate attractive force.

First, clamping motor 28 is activated in the closed-mold state. Toggle mechanism 27 is unlocked and the closed-mold state is slightly relaxed. The reactive force from fixed plate M2 decreases and the retaining force thereby decreases. The decrease in the retaining force is the same as the decrease in the reactive force. In this stage, moving plate M1 is retained by moving clamp 5 with sufficient retaining force and moving plate M1 is unlikely to detach from moving clamp 5.

When main body M8 of moving plate M1 is separated from fixed plate M2, the reactive force (the pushing force) that main body M8 receives from moving plate M1 is lost. However, moving plate M1 receives pulling force from fixed plate M2 due to friction that is caused by the slide movement between guide pin M9 and receiving bore M10. The separation force, i.e., the pulling force that is generated in moving plate M1 by a sliding part (guide pin M9) is referred to as mold-opening force F1 (refer to FIG. 2B). Mold-opening force F1 acts in the direction to separate moving plate M1 from moving clamp 5. Mold-opening force F1 greatly reduces the retaining force of moving plate M1.

Next, ejector pin M11 is operated to remove the product (not illustrated). When the product is detached from inner surface M4 of moving plate M1, moving plate M1 receives pulling force from the product. This pulling force also acts in the direction to separate moving plate M1 from moving clamp 5. The separation force, i.e., the pulling force that is generated in moving plate M1 by ejector pin M11 when ejector pin M11 is operated is referred to as ejector pin reactive force F2 (refer to FIG. 2B). It should be noted that although ejector pin reactive force F2 is shown as a constant value in FIG. 5A, ejector pin reactive force F2 actually often varies with time.

As illustrated in FIG. 5A, when both mold-opening force F1 and ejector pin reactive force F2 are applied simultaneously, the retaining force further decreases. The timing at which ejector pin reactive force F2 is applied is not limited to the timing illustrated in the figure, and, for example, ejector pin reactive force F2 may be applied when mold-opening force F1 is not applied.

Figure 5B:
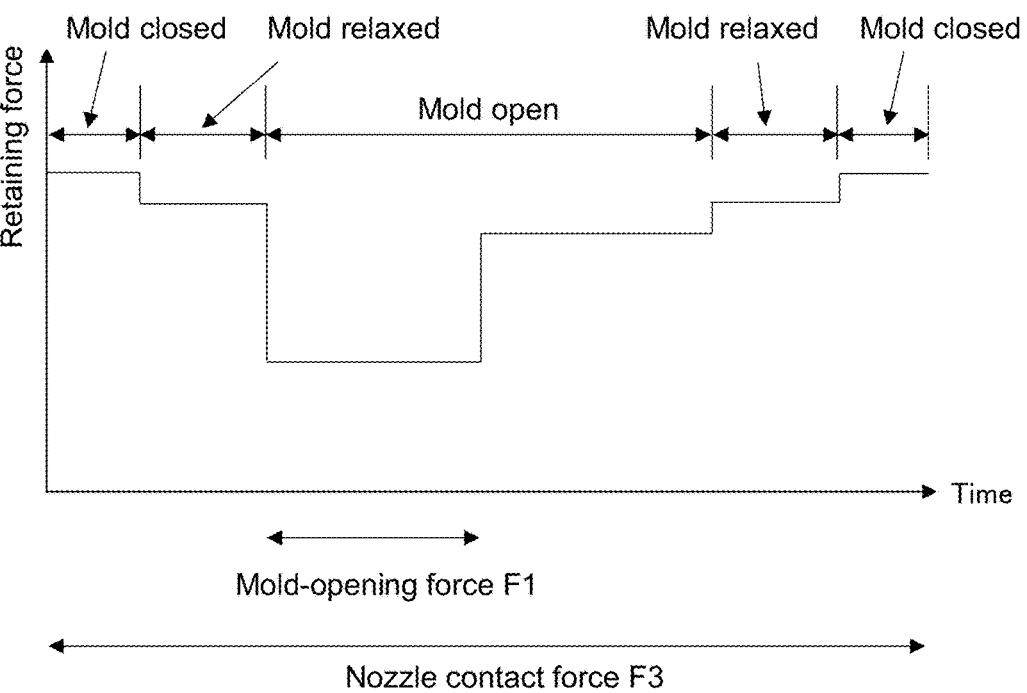
FIG. 5B is a conceptual view illustrating the force acting on the fixed plate during a molding process.

FIG. 5B conceptually shows the retaining force that acts on fixed plate M2 during one molding process. The retaining force of fixed plate M2 is substantially the same as the retaining force of moving plate M1. In the closed-mold state, fixed plate M2 is pushed by moving plate M1, and when toggle mechanism 27 is unlocked, the retaining force slightly decreases. When main body M8 of moving plate M1 is subsequently separated from fixed plate M2, the pushing force is lost.

Further, fixed plate M2 receives pulling force (mold-opening force F1) from moving plate M1 due to the friction that is caused by the slide movement between guide pin M9 and receiving bore M10. In addition, fixed plate M2 receives separation force that is generated by injection nozzle 37. This separation force is referred to as nozzle contact force F3 (refer to FIG. 2B). Nozzle contact force F3 includes not only the force that is directly caused by injection nozzle 37 that is pushed against fixed plate M2 but also the force that is caused by resin that leaks from injection nozzle 37 and thereby applied to fixed plate M2.

The principle of generating nozzle contact force F3 depends on the mechanism for driving nozzle touch mechanism 38. In the case of motor-driven nozzle touch mechanism 38, nozzle contact force F3 is generated by the resilient force of a spring (not illustrated) that pushes injection nozzle 37. Nozzle contact force F3 is also generated by braking nozzle touch mechanism 38 is being operated (while motor torque is being applied). In the case of hydraulic nozzle touch mechanism 38, nozzle contact force F3 is generated by the pressure in the cylinder.

Control of the Retaining Force of the Mold by Controller 4

Next, referring to FIGS. 1, 2A, and 2B, the operation principle of controller 4 will be described. When the retaining force of moving plate M1 is lost, moving plate M1 is more likely to detach from moving clamp 5. When the retaining force of fixed plate M2 is lost, fixed plate M2 is more likely to detach from fixed clamp 6. Therefore, controller 4 controls injection molding machine 1 such that the moving plate separation force is less than the moving plate attractive force and such that the fixed plate separation force is less than the fixed plate attractive force. As described previously, the chief separation forces that are applied to moving plate M1 are mold-opening force F1 and ejector pin reactive force F2, and the chief separation forces that are applied to fixed plate M2 are mold-opening force F1 and nozzle contact force F3. Therefore, controller 4 controls these forces F1 to F3.

Figure 6:
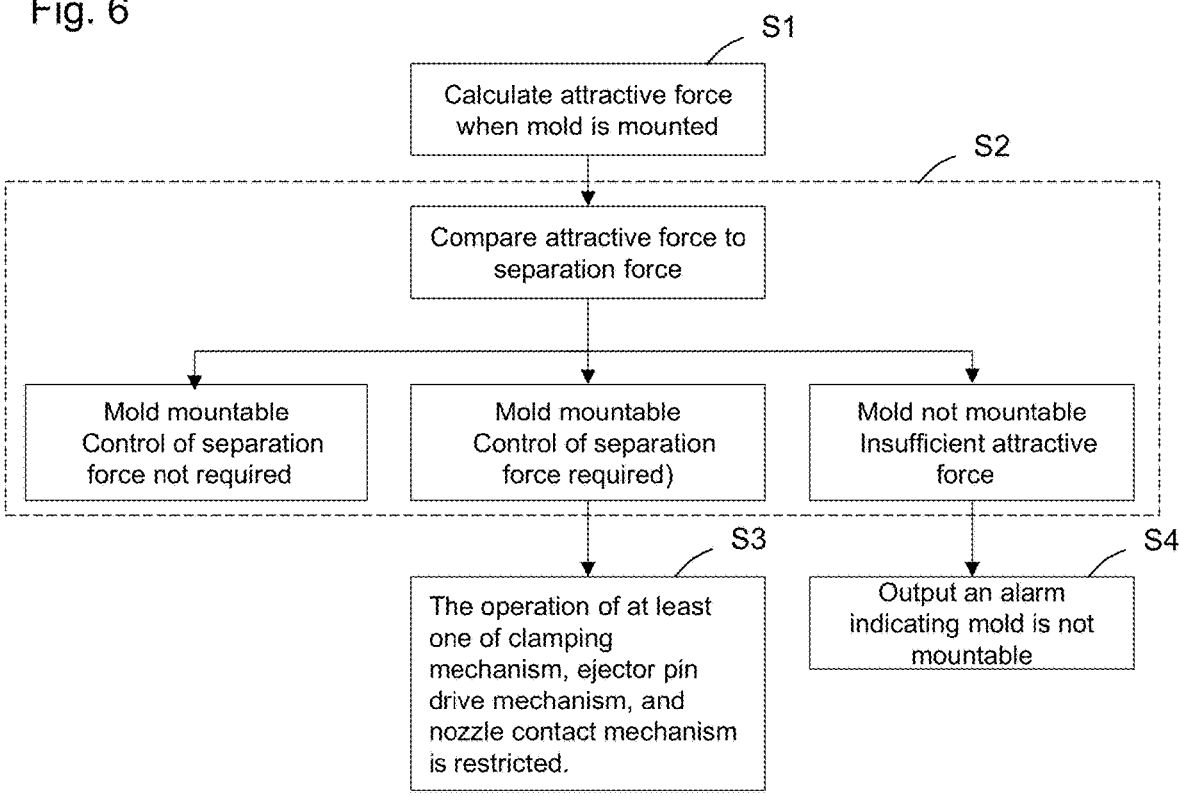
FIG. 6 is a flow diagram illustrating the control by a controller.

FIG. 6 specifically shows the flow of control that is conducted by controller 4. When mold M is mounted, controller 4 calculates the attractive force of mold M based on the induced voltage or the induced current that is measured by measurement device 16 (Step S1) and classifies the calculated attractive force into the following three classes (Step S2):

Class 1: Control of the separation force to reduce the separation force to less than the attractive force is not required.

Class 2: Control of the separation force to reduce the separation force to less than the attractive force is required.

Class 3: Control of the separation force to reduce the separation force to less than the attractive force is impossible.

Class 1 means that the attractive force is sufficiently large and that the control of clamping mechanism 26, ejector pin drive mechanism 29, and nozzle touch mechanism 38 is not required. Therefore, in this case, controller 4 does not perform special control and controls injection molding machine 1 in the conventional manner.

Class 2 means that by controlling at least one of clamping mechanism 26, ejector pin drive mechanism 29, and nozzle touch 38, the molding process can be performed while reducing the possibility of detachment of mold M. Controller 4 controls at least one of clamping mechanism 26, ejector pin drive mechanism 29, and nozzle touch mechanism 38 such that the separation force is less than the attractive force. Further, controller 4 controls injection molding machine 1 to perform the molding process while reducing the possibility of detachment of mold M in this manner (Step S3). In this step, controller 4 may output information indicating that the separation force is controlled. The information may be outputted by display on a screen of controller 4, by voice, by signals, and the like, but the manner of the output is not limited.

Controller 4 controls clamping mechanism 26 of moving plate M1 such that mold-opening force F1 is less than the attractive force. Controller 4 preferably controls clamping mechanism 26 and ejector pin drive mechanism 29 of moving plate M1 such that the sum of mold-opening force F1 and ejector pin reactive force F2 is less than the attractive force. In addition, controller 4 preferably controls clamping mechanism 26 and nozzle touch mechanism 38 such that the sum of mold-opening force F1 and nozzle contact force F3 is less than the attractive force.

More specifically, controller 4 controls the mold-opening speed of moving plate M1. This control is effected because the friction force between guide pin M9 and receiving bore M10 that determines mold-opening force F1 is believed to correlate with the relative speed between guide pin M9 and receiving bore M10. Controller 4 further controls the speed of ejector pin M11. This control is effected because the detaching force between the product and the inner surface of moving plate M1 that determines ejector pin reactive force F2 is believed to correlate with the relative speed between ejector pin M11 and moving plate M1.

Nozzle contact force F3 is controlled by controlling the position of injection nozzle 37 in the X-direction relative to fixed plate M2. In order to decrease nozzle contact force F3, injection nozzle 37 is moved backward from fixed plate M2 for some seconds at the time of or before the operation to open the mold is started. In order to increase nozzle contact force F3, injection nozzle 37 is moved forward toward fixed plate M2. In order to set nozzle contact force F3 to zero, injection nozzle 37 is separated from fixed plate M2. In order to generate nozzle contact force F3 again, injection nozzle 37 is moved forward again toward fixed plate M2 after the mold is closed such that injection nozzle 37 touches fixed plate M2.

Class 3 means that the attractive force is too small to sufficiently reduce the possibility of detachment of mold M by controlling clamping mechanism 26, ejector pin drive mechanism 29, and nozzle touch mechanism 38. Therefore, in this case, controller 4 outputs an alarm indicating that mold M cannot be mounted (Step S4).

Machine Learning

Figures 7, 8:
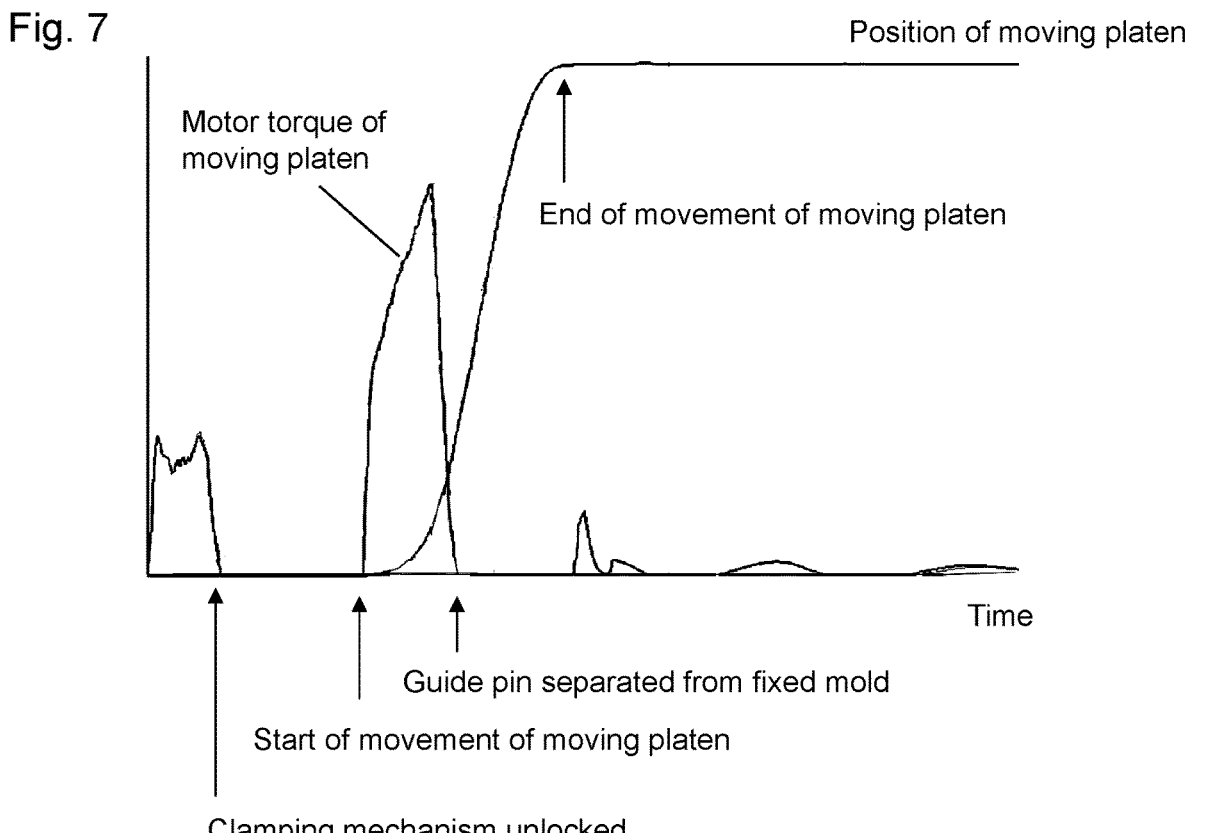
FIG. 7 is a graph showing temporal changes of the position of a moving platen and the motor torque of a clamping motor.
FIG. 8 is a partial schematic view of the controller relating to machine learning.

FIG. 8 shows a part of controller 4 that relates to machine learning. As described previously, the separation force that is applied to mold M includes mold-opening force F1. Mold-opening force F1 also depends on the shape of mold M. Therefore, mold-opening force F1 may be obtained based on the shape of mold M. Controller 4 preferably includes input portion 41 for three-dimensional shape data of moving plate M1 and fixed plate M2 and estimation portion 42 that estimates mold-opening force F1 based on the three-dimensional shape data. Estimation portion 42 includes trained model 43.

The method of training trained model 43 is not limited but, for example, supervised learning may be used. Specifically, sets of three-dimensional shape data of mold M (moving plate M1 and fixed plate M2) and the measurement of the motor torque of clamping motor 28 that corresponds to mold M are obtained in advance for various molds M having different three-dimensional shapes, and the sets are learned by trained model 43 as training data. Estimation portion 42 uses trained model 43 to estimate mold opening force F1 based on the three-dimensional shape data of moving plate M1 and fixed plate M2 that are obtained by input portion 41. Controller 4 controls the mold-opening speed of moving plate M1 such that mold-opening force F1 that is estimated by estimation portion 42 is less than the attractive force.

EXAMPLES

Figure 9A:
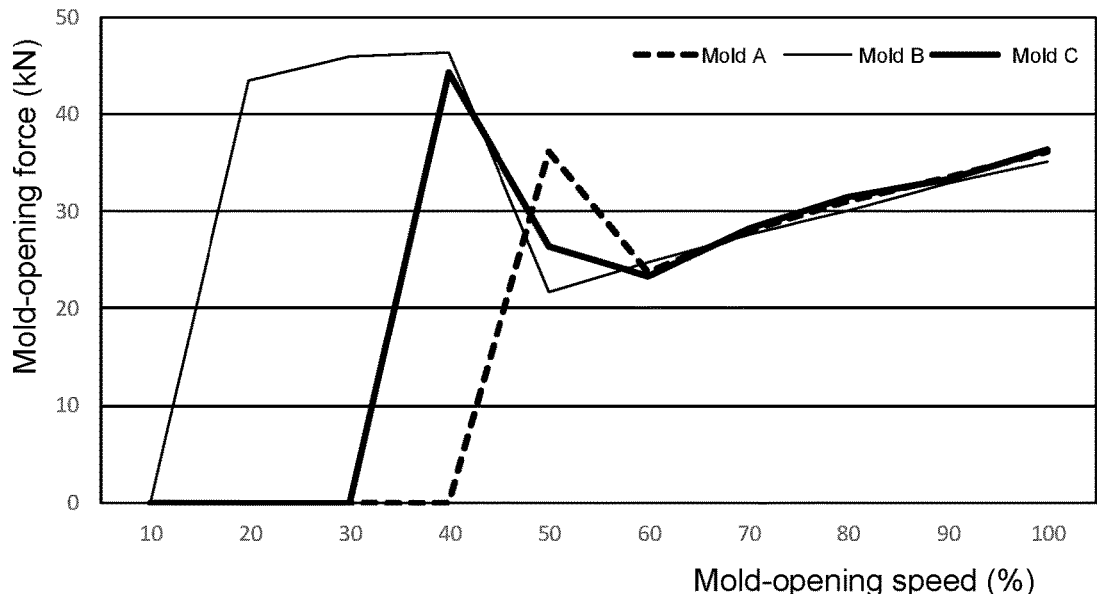
FIG. 9A is a graph showing the relationship between the mold-opening speed and the mold-opening force.
Figure 9B:
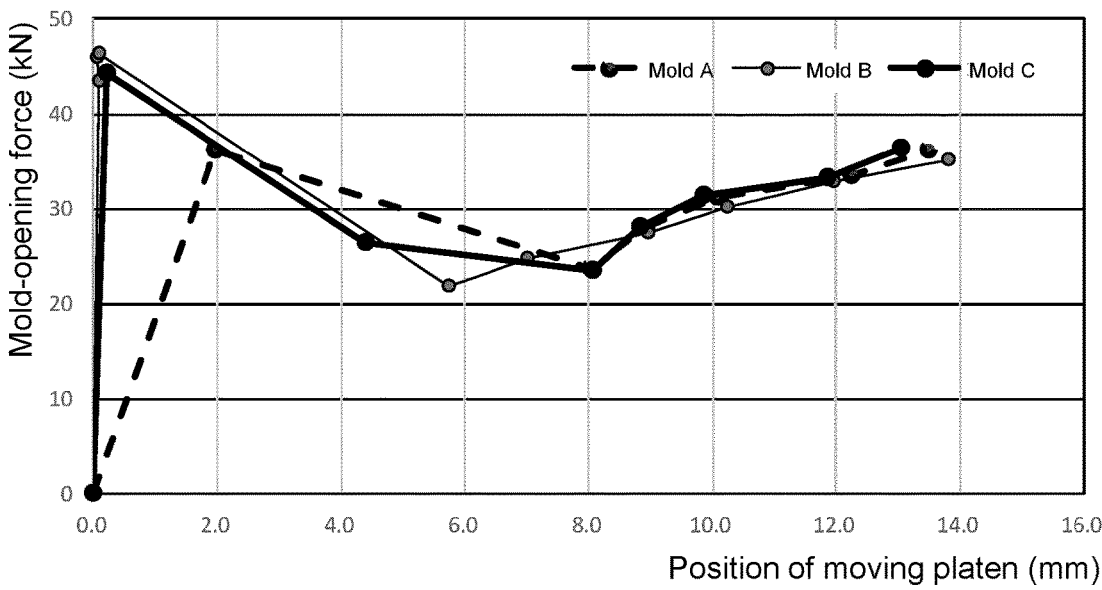
FIG. 9B is a graph showing the relationship between the position of the moving platen and the mold-opening force.

Examples will next be described with reference to FIGS. 7, 9A, and 9B. The following description of the examples also refers to FIGS. 1, 2A, and 2B as needed. As illustrated in FIG. 7, the operation of opening the mold was performed using an actual injection molding machine, and mold-opening force F1 was calculated based on the motor torque of clamping motor 28 and the position of moving platen 24. Ejector pin reactive force F2 and nozzle contact force F3 were not applied. Moving platen 24 gradually moved immediately after the mold was open, then moved at a substantially constant speed and thereafter gradually moved toward the fully-open position of moving platen 24.

The motor torque of clamping motor 28 increased when the operation to unlock clamping mechanism 26 was started, then sharply increased when moving platen 24 started to move and became zero when moving platen 24 started to move at a constant speed. The maximum value of the motor torque was observed after a certain time had passed after moving platen 24 had started to move. This shows that mold-opening force F1 was generated after main body M8 of moving plate M1 was separated from fixed plate M2.

Therefore, it is preferable that controller 4 control the speed of moving plate M1 such that mold-opening force F1 is less than the attractive force after main body M8 of moving plate M1 is separated from fixed plate M2 and until a sliding part (guide pin M9) is separated from fixed plate M2. In other words, the need to limit the speed of moving plate M1 is small after the sliding part is separated from fixed plate M2. In addition, it was confirmed in this test that mold-opening force F1 was less than the attractive force. However, it should be noted that mold-opening force F1 may be greater than the attractive force depending on the type of injection molding machine.

Next, the relationship between the mold-opening speed and mold-opening force F1 and the relationship between the position of moving platen 24 and mold-opening force F1 were obtained using several molds. FIG. 9A shows the relationship between the mold-opening speed and mold-opening force F1 at an early stage of the mold-opening step. FIG. 9B shows the relationship between the position of moving platen 24 and mold opening force F1 at an early stage of the mold-opening step. The horizontal axes of these graphs correlate with time. Mold A has the largest mountable size for the injection molding machine that was used in the test, mold C has the smallest mountable size for the injection molding machine that was used in the test, and mold B has a size between mold A and mold C.

Mold-opening force F1 started to increase at about 10% of the largest mold-opening speed in the case of mold B, at about 30% of the largest mold-opening speed in the case of mold C, and at about 40% of the largest mold-opening speed in the case of mold A, then decreased and thereafter increased again. Since molds A to C that were used in the test are believed to represent all sizes of molds that are mountable to the injection molding machine, it was found that mold-opening force F1 is not generated when the mold-opening speed is less than 10% of the highest mold-opening speed irrespective of the size of a mold. Further, referring to FIG. 9B, the largest value of mold-opening force F1 occurred when moving platen 24 was positioned in the range of from 0 to 2.0 mm.

Although certain preferred embodiments of the present invention have been shown and described in detail, it should be understood that various changes and modifications may be made without departing from the spirit or scope of the appended claims.

| LIST OF REFERENCE NUMERALS | |
| --- | --- |
| 1 | injection molding machine |
| 3 | injection unit |
| 4 | controller |
| 9 | clamp |
| 16 | measurement device |
| 26 | clamping mechanism |
| 29 | ejector pin drive mechanism |
| 37 | injection nozzle |

-continued

| LIST OF REFERENCE NUMERALS | |
| --- | --- |
| C | cavity |
| M1 | moving plate |
| M2 | fixed plate |
| M9 | guide pin (sliding part) |
| M11 | ejector pin |

What is claimed is:

1. An injection molding machine comprising:
a clamp that generates an electromagnetic force and that secures a moving plate or a fixed plate to the clamp using an attractive force that is produced by the electromagnetic force; and
a controller configured to control a separation force that acts on the moving plate or the fixed plate such that the separation force is less than the attractive force in a molding process from start of a first operation to release a closed-mold state to completion of a second operation to form a next-closed mold state.

2. The injection molding machine according to claim 1, further comprising a clamping mechanism that drives the moving plate, wherein:
the separation force is a mold-opening force that is generated in the moving plate or the fixed plate in a mold-opening step, and
the controller is configured to control the clamping mechanism such that the mold-opening force is less than the attractive force.

3. The injection molding machine according to claim 2, wherein the controller is configured to control a mold-opening speed of the moving plate such that the mold-opening force is less than the attractive force.

4. The injection molding machine according to claim 3, wherein:
the moving plate has a sliding part that slides relative to the fixed plate and that thereby generates the mold-opening force, and
the controller is configured to control the mold-opening speed of the moving plate such that the mold-opening force is less than the attractive force after a main body of the moving plate is separated from the fixed plate and until the sliding part is separated from the fixed plate.

5. The injection molding machine according to claim 3, further comprising:
an input portion for three-dimensional shape data of the moving plate and the fixed plate; and
an estimation portion that estimates the mold-opening force based on the three-dimensional shape data, wherein:
the controller is configured to control the mold-opening speed of the moving plate such that the mold-opening force that is estimated by the estimation portion is less than the attractive force.

6. The injection molding machine according to claim 1, further comprising an ejector pin drive mechanism that drives an ejector pin for pushing out a product from the moving plate, wherein:
the separation force is an ejector pin reactive force that is generated in the moving plate when the ejector pin is operated, and
the controller controls the ejector pin drive mechanism such that the ejector pin reactive force is less than the attractive force.

11

7. The injection molding machine according to claim 6, wherein the controller is configured to control a speed of the ejector pin.

8. The injection molding machine according to claim 1, further comprising:

a clamping mechanism that drives the moving plate; and an ejector pin drive mechanism that drives an ejector pin for pushing out a product from the moving plate, wherein:

the separation force is sum of a mold-opening force that is generated in the moving plate in a mold-opening step and an ejector pin reactive force that is generated in the moving plate when the ejector pin is operated, and the controller is configured to control the clamping mechanism and the ejector pin drive mechanism such that the sum is less than the attractive force.

9. The injection molding machine according to claim 1, further comprising:

an injection nozzle for supplying material to be injected into a cavity that is formed by the moving plate and the fixed plate, and a nozzle touch mechanism that drives the injection nozzle, wherein:

the separation force is a nozzle contact force that is generated in the fixed plate by the injection nozzle, and the controller is configured to control the nozzle touch mechanism such that the nozzle contact force is less than the attractive force.

10. The injection molding machine according to claim 1, further comprising:

a clamping mechanism that drives the moving plate;

an injection nozzle for supplying material to be injected into a cavity that is formed by the moving plate and the fixed plate, and a nozzle touch mechanism that drives the injection nozzle, wherein:

the separation force is sum of a mold-opening force that is generated in the fixed plate in a mold-opening step and a nozzle contact force that is generated in the fixed plate by the injection nozzle, and the controller is configured to control the clamping mechanism and the nozzle touch mechanism such that the sum is less than the attractive force.

11. The injection molding machine according to claim 1, wherein:

the controller is configured to classify the attractive force into a first class in which control of the separation force to reduce the separation force to less than the attractive force is not required, a second class in which the control is required, or a third class in which the control is impossible, and the controller is configured to control the separation force such that the separation force is less than the attractive force when the controller judges that the control is required.

12. The injection molding machine according to claim 11, wherein when the controller judges that the control is required, the controller outputs information that indicates that the separation force is to be controlled.

13. The injection molding machine according to claim 11, wherein the controller is configured to output an alarm when the controller judges that the control is impossible.

14. The injection molding machine according to claim 1, wherein:

the clamp includes magnet blocks each generating magnetic flux that attracts the fixed plate or the moving plate, the injection molding machine further comprises measurement devices each detecting the magnetic flux for a respective magnet block, and the controller is configured to calculate the attractive force based on the magnetic flux that is measured by the measurement devices.

15. A method of operating an injection molding machine, wherein:

the injection molding machine comprises a clamp that generates an electromagnetic force and a controller, and the clamp secures a moving plate or a fixed plate to the clamp using an attractive force that is produced by the electromagnetic force, the method comprises the step of using the controller to control a separation force that acts on the moving plate or the fixed plate such that the separation force is less than the attractive force in a molding process from start of a first operation to release a closed-mold state to completion of a second operation to form a next closed-mold state.

* * * * *